US009043237B2

(12) United States Patent
McCarthy

(10) Patent No.: US 9,043,237 B2
(45) Date of Patent: May 26, 2015

(54) SYSTEMS AND METHODS FOR MAKING A PAYMENT USING A WIRELESS DEVICE

(75) Inventor: John F. McCarthy, Killorglin (IE)

(73) Assignee: Fexco Merchant Services, Killorglin, Co. Kerry (IE)

(*) Notice: Subject to any disclaimer, the term of this patent is extended or adjusted under 35 U.S.C. 154(b) by 357 days.

(21) Appl. No.: 13/239,054

(22) Filed: Sep. 21, 2011

(65) Prior Publication Data
US 2013/0073365 A1 Mar. 21, 2013

(51) Int. Cl.
G06Q 40/00 (2012.01)
G06Q 20/32 (2012.01)
G06Q 20/02 (2012.01)
G06Q 20/12 (2012.01)
G06Q 20/20 (2012.01)

(52) U.S. Cl.
CPC ............ *G06Q 20/3276* (2013.01); *G06Q 20/02* (2013.01); *G06Q 20/12* (2013.01); *G06Q 20/20* (2013.01)

(58) Field of Classification Search
None
See application file for complete search history.

(56) References Cited

U.S. PATENT DOCUMENTS

| 6,745,937 | B2* | 6/2004 | Walsh et al. ................. 235/379 |
| 7,159,770 | B2 | 1/2007 | Onozu |
| 7,483,858 | B2 | 1/2009 | Foran et al. |
| 7,810,720 | B2 | 10/2010 | Lovett |
| 7,861,922 | B2* | 1/2011 | Lee et al. ..................... 235/379 |
| 2001/0051915 | A1 | 12/2001 | Ueno et al. |
| 2002/0147913 | A1* | 10/2002 | Lun Yip ........................ 713/184 |
| 2005/0009564 | A1 | 1/2005 | Hayaashi et al. |
| 2005/0029358 | A1 | 2/2005 | Mankins |
| 2005/0203854 | A1 | 9/2005 | Das et al. |
| 2007/0100651 | A1 | 5/2007 | Ramer et al. |
| 2007/0130085 | A1 | 6/2007 | Zhu |
| 2007/0174198 | A1 | 7/2007 | Kasahara et al. |
| 2008/0162348 | A1* | 7/2008 | Lee et al. ..................... 705/44 |
| 2008/0195536 | A1 | 8/2008 | Karns et al. |
| 2008/0222048 | A1 | 9/2008 | Higgins et al. |

(Continued)

FOREIGN PATENT DOCUMENTS

EP 1 513 120 A2 3/2005

OTHER PUBLICATIONS

International Search Report and Written Opinion of PCT/EP2012/068581 mailed Nov. 15, 2012, 8 pages.

*Primary Examiner* — Olabode Akintola
(74) *Attorney, Agent, or Firm* — Kilpatrick Townsend & Stockton LLP

(57) ABSTRACT

Embodiments of the invention provide methods and systems for performing a payment transaction. A method for performing a payment transaction may include receiving purchase information from a merchant and associating the purchase information with an identifier. The method may also include transmitting the identifier to the merchant and receiving the identifier from a wireless device of a customer. The wireless device may obtain the identifier by receiving a code from a merchant device and by interpreting the code. The method may additionally include associating the identifier with the purchasing information, determining a payment account associated with the customer, transmitting a request to a payment service provider system to provide funds for the payment transaction, and receiving an authorization from the payment service provider system to provide the funds. The method may additionally include transmitting a confirmation of the authorization to the merchant.

22 Claims, 7 Drawing Sheets

(56) References Cited

U.S. PATENT DOCUMENTS

| | | |
|---|---|---|
| 2008/0228642 A1 | 9/2008 | Kim et al. |
| 2009/0088202 A1 | 4/2009 | Toomer et al. |
| 2009/0099961 A1 | 4/2009 | Ogilvy |
| 2009/0157472 A1* | 6/2009 | Burazin et al. .................. 705/10 |
| 2009/0222353 A1 | 9/2009 | Guest et al. |
| 2009/0265211 A1* | 10/2009 | May et al. ......................... 705/9 |
| 2010/0131415 A1* | 5/2010 | Sartipi ............................. 705/75 |
| 2010/0211475 A1 | 8/2010 | Nojima et al. |

* cited by examiner

SYSTEMS AND METHODS FOR MAKING A PAYMENT USING A WIRELESS DEVICE

BACKGROUND OF THE INVENTION

Embodiments of the invention are generally directed toward performing payment transactions and more specifically toward performing payment transaction involving a wireless device.

Commerce involving wireless devices, such as mobile phones, is quickly becoming a convenient and popular way to perform transactions. One advantage of using wireless devices is the ability to store large amounts of data and personal information. Another advantage is the ease and accessibility wireless devices provide. For example, wireless devices allow individuals to exchange funds without requiring the individuals to access a bank or other financial institution. Further, wireless devices replace the need for consumers to carry other payment tools, such as credit and/or debit cards. A disadvantage of using wireless devices in some commerce situations is the need for merchants to update existing devices or add entirely new devices to accommodate the operations of the wireless device. Another disadvantage is rolling out or introducing new wireless devices that support new payment methods. These issues often raise various problems for both merchants and consumers. For example, the costs required for merchants to acquire new hardware in order to provide the new payment method may be large and, therefore, may make it difficult for merchants to justify offering the new payment method. In addition, consumers may be unwilling to invest in a wireless device having the hardware necessary for the new payment method until they are comfortable that enough merchants offer or accept the new payment method. Likewise, merchants may be unwilling to invest in the hardware necessary for the new payment method until they are confident that consumer demand is high enough to justify the investment (e.g., that enough consumers own wireless devices with the appropriate hardware). This situation can result in a stalemate where neither consumers nor merchants are willing to invest in the required hardware first. There is a need to address these disadvantages to provide more efficient approaches that minimize the use of resources and the necessity for devices to be adapted for use in commerce transactions. There is also a need to improve interoperability of the technical means used in wireless device commerce transactions.

A further disadvantage is the current onus upon users owing to the considerable amount of data input that is required in commerce transactions. A more simplified approach would be desirable that minimizes user input, and that works in conjunction with an approach that address interoperability and adaptability issues. Another disadvantage still may be the ability to steal the information (personal or financial) stored on the wireless device. Since wireless devices continue to grow in popularity and since worldwide access to these devices continues to increase, the use of wireless devices in commerce will likely also increase. There is therefore a need to improved security of the devices in the commerce transactions.

There is a need to address the disadvantages described above and provide for improved methods of using wireless device in commerce.

BRIEF SUMMARY OF THE INVENTION

Embodiments of the invention provide systems and methods for performing payment transactions that involve wireless devices. According to one embodiment, a method for performing a payment transaction may be performed by a payment system and may include receiving purchase information from a merchant where the purchase information includes information associated with one or more goods or services being purchased by a customer. The method also includes associating the purchase information with a transaction identifier and transmitting the transaction identifier to the merchant. A merchant device may generate a machine readable code based on the transaction identifier. The method further includes receiving the transaction identifier from a wireless device associated with the customer. The wireless device may obtain the transaction identifier upon the wireless device receiving the machine readable code from a merchant device.

The method may additionally include associating the transaction identifier received from the wireless device with the purchasing information received from the merchant. The method may additionally include determining a payment account associated with the customer and transmitting, to a payment service provider system, an authorization request to provide funds for the payment transaction. The method may additionally include receiving, from the payment service provider system, an authorization to provide funds for the payment transaction and transmitting a confirmation of the authorization to the merchant so as to effect a transfer of the one or more goods or services to the customer.

The method may additionally include receiving coupon information from the wireless device of the customer, associating the coupon information with the one or more goods or services to be purchased by the customer, and completing the payment transaction so that the customer is credited with an amount of the coupon. The method may additionally include transmitting the coupon information to the wireless device along with a request to use the coupon in the payment transaction and receiving a confirmation from the wireless device to use the coupon in the payment transaction. The payment system that may perform the payment transaction may include a communication interface, a memory device having instruction stored thereon, and a processor communicatively coupled with the memory. The instructions stored on the memory may cause the processor to perform the above method.

According to another embodiment, a method for performing an electronic transaction may include receiving a transaction identifier from a wireless device associated with a user. The wireless device may obtain the transaction identifier upon the wireless device receiving readable code and optionally interpreting the readable code. The method may also include associating the transaction identifier with one or more goods or services offered by a merchant and determining payment account information associated with the user. The method may further include transmitting, to a payment service provider, a payment authorization request to provide funds for payment of the one or more goods or services and receiving, from the payment service provider, an authorization to provide funds for the payment transaction. The method may additionally include transmitting a transaction authorization request to the wireless device to authorize the transaction; and receiving a confirmation from the wireless device to authorize the transaction. The method may additionally include transmitting payment information to the merchant to effect a transfer of the one or more goods or services to the customer.

BRIEF DESCRIPTION OF THE DRAWINGS

The present disclosure is described in conjunction with the appended figures.

DETAILED DESCRIPTION OF THE INVENTION

Figure 1:
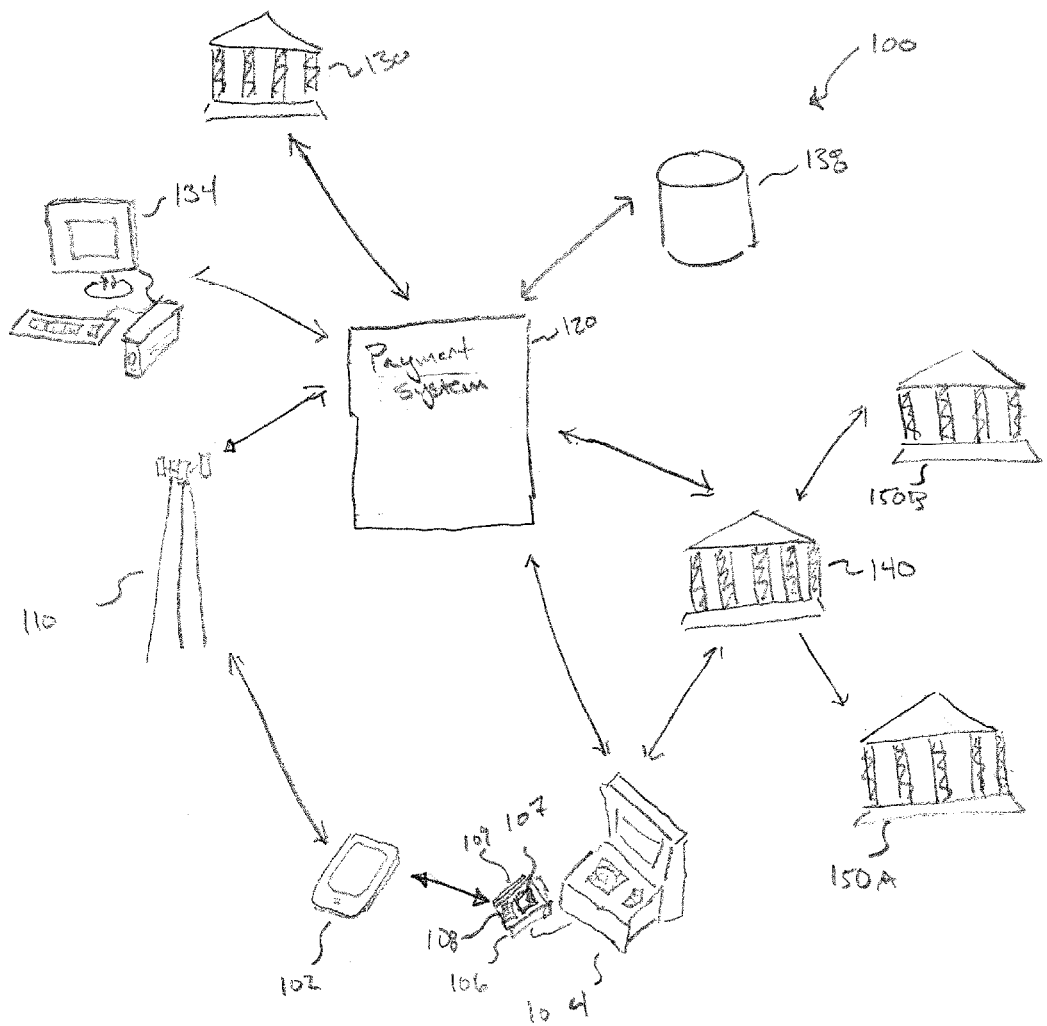
FIG. 1 illustrates a system for performing payment transaction using a wireless device according to an embodiment of the present invention.

Embodiments of the invention provide methods and systems for performing a payment transaction using a wireless device. The system may include a payment system that functions with one or more other systems to perform the payment transaction. For example, the payment system may send and receive message between a wireless device, a merchant's point of sale device, and a payment service provider system to perform the payment transaction. In some embodiments, the payment system may function to settle a transaction between the merchant and customer, such as by transferring funds from the customer's account to the merchant's account. As used herein, a wireless device may refer to any kind of device including: a mobile or cell phone, a personal digital assistant (PDA), a tablet computer (e.g., iPad®), and the like. A merchant point of sale device may include: a device at a checkout location of a merchant, a kiosk, a vending machine, a mobile phone, a wired or wireless device, and the like.

In one embodiment, the payment system receives information from a merchant point of sale device about a pending purchase authorization. The payment system associates the purchase information with an transaction identifier, which may include an alpha numeric code. In some embodiments, the transaction identifier may have a "shelf life" or defined amount of time in which the transaction identifier may be used. This "shelf life" may depend on the merchant, circumstances of the sale, product(s) or service(s) being purchased, and the like. In some embodiments, the code may be assigned to a particular sales channel (such as an individual point of sale device) and the transaction to which it is assigned may change depending on the time stamp of the transaction. In addition, the payment system may be designed to allow transaction identifiers to used for services other than sales transactions, such as a fund transfer transaction, a coupon or voucher association and/or redemption (e.g., the transaction identifier could associate the coupon or voucher with a wireless device or user of the device), and the like.

After associating the transaction identifier with the purchase information, the payment system then transmits the transaction identifier to the merchant point of sale device where the transaction identifier is converted into a machine readable code, such as a bar code or a near field communication code. The barcode is displayed on the merchant point of sale device where it is captured by a wireless device (e.g., mobile phone camera) of the customer purchasing the goods or services. The wireless device converts the barcode into the transaction identifier and transmits the transaction identifier to the payment system. This enables the number of inputs in the transaction process required by the user to be minimized. The payment system then associates the transaction identifier with the pending purchase and transmits an authorization request to a payment service provider (assuming the payment system does not settle the transaction) in order to authorize the transaction.

In some embodiments, one or more transaction identifiers could be cached on the merchant point of sale device. The transaction identifier(s) could be stored on the point of sale device long term, could be uploaded to the point of sale device after some or each transaction, or could be uploaded as part of an end of day batching process. The point of sale device may then convert one or more of the transaction identifiers into machine readable code (e.g., a barcode, near field communication code, and the like) either at the point of sale or prior thereto. Using such approach may speed up purchase transactions by eliminating the need for the point of sale device to establish contact with the payment system before displaying or providing the machine readable code. In such an embodiment, once the merchant entered in or obtained the value purchase amount, the point of sale device could display or provide the machine readable code. The point of sale device (or some other merchant device) would then connect to the payment system and provide the purchase transaction details and the transaction identifier associated with the machine readable code that was displayed or provided. The payment system would then associate both the purchase transaction details and transaction identifier on its system and wait for a communication from the wireless device. One advantage of such approach is that the user can acquire the machine readable code immediately without waiting for the point of sale device to connect to the payment system—thereby reducing the transaction time.

If the transaction is authorized, the payment system receives an authorization from the payment service provider and transmits a confirmation message to the merchant point of sale device and/or the user's wireless device to confirm that the transaction has been authorized. After receiving a payment authorization, the merchant may then deliver the goods and/or services to the customer. The payment system may then transmit a confirmation message to the payment service provider to settle the purchase transaction or may settle the purchase transaction itself. The purchase transaction may involve traditional payment methods, such as credit, debit, checking, and the like, or may involve e-commerce/money transfer transactions (e.g., PayPal®), prepaid money accounts, gift certificates, and the like.

In performing the payment transaction, the payment system may also transmit account information, including account balance information, to the customer and receive an authorization from the customer to continue with the purchase. The system may automatically determine what accounts are appropriate for the transaction and present the account most appropriate for the transaction depending on previously inputted preferences of the user. Transmitting account information, account balance, and the like improves efficiency by minimizing the number of steps in the process. The payment system may further perform a security authentication check to verify that the customer and/or wireless device is associated with the payment account. The security authentication may involve biometric identification, password authentification, location verification, and the like.

In some embodiments, the wireless device may capture the transaction identifier without capturing a barcode. For example, an alphanumeric code may be transmitted from the merchant point of sale to the wireless device, such as by near field communication (NFC), Bluetooth, WiFi, IEEE 802.11, and the like. After receiving the alphanumeric code, the wireless device may transmit the code to the payment system. This advantageously minimizes the input required on behalf of the user.

In some embodiments, the payment system may also store information about the user and/or user's payment account on a cloud network. For example, the user's physical address, phone number, email address, credit card account information, debit account information, e-commerce or online service payment provider account information (e.g., PayPal), checking account information, and the like may be stored on the cloud. The payment system may access the user profile stored on the cloud to access account information and complete a transaction, to access the user's physical address to send to a merchant for shipping purposes, and the like. The utilization of a user profile containing such information increases efficiency and optimizes the system since nearly all information necessary to complete a transaction (e.g., account information, user's physical address, and the like) is centrally stored and the number of steps required to complete the transaction is minimized. In other embodiments, the user may provide account information and/or other information (e.g., shipping address) at the time of the purchase to complete the pending transaction.

The payment system may also receive coupon or voucher information (hereinafter coupon or coupon information) that may be used to complete the pending transaction. For example, the user may capture coupon information with the wireless device by scanning/photographing a barcode of the coupon, manually entering the barcode information, photographing/capturing an image of the coupon, downloading coupon information from a network (e.g., the Internet), receiving coupon information via email and/or accessing an email having coupon information, receiving the coupon via wireless communication (e.g., NFC, Bluetooth) such as by placing the wireless device in close proximity to a system or device having coupon information, and the like. A non-limiting example of coupon or coupon information may include, among other things, a discount on a product such as a manufacturer's or retailer's discount (e.g., an amount or percentage off one or more items or a total purchase price), a rebate, cash back, an offer for a promotional item, a gift certificate, a buy one or more items get one or more items free offer, free shipping offer, and the like. The coupon may be immediately redeemable or redeemable in the future.

The user may send the coupon information to the payment system, which may store the coupon information on a cloud network and/or in the user's profile. The user may also capture and transmit the coupon information using a personal computing device, such as a laptop or personal computer. The coupon information may be transmitted to the payment system via one or more networks, such as the Internet. The coupon information and/or coupon barcode may be displayed in a magazine, book, periodical, on a website, television, advertisement, billboard, and the like. For example, the user may photograph an image of the coupon (or the coupon's barcode) that is displayed on a television commercial or in a magazine advertisement and transmit the coupon information to the payment system. The coupon information may be received by the wireless device via wireless communication (NFC, Bluetooth, and the like) by placing the wireless device in close proximity to a device or object having or storing the coupon information. The payment system may store the coupon information in a user profile on a cloud network and/or may credit the user's prepaid account with an amount of the coupon, or the benefit or special offer associated with the coupon. The coupon and/or credit associated with the coupon may be used in a subsequent transaction involving the item associated with the coupon.

In some embodiments, the user may register with the payment system for the wireless device payment service. The registration may involve providing the payment system with personal information, such as physical address, email address, phone number, identification information, and/or providing payment account information, such as credit card information, checking account information, online money transfer service (e.g., PayPal®) username and/or password, and the like. The payment system may create and manage a user profile for the user, which stores the user's information. The user profile may be stored on a cloud network and/or on a database. The user may access the user profile to set default payment options, shipping address, and the like. Specifying the default account that may be later used by the payment system provides the advantage of increasing efficiency of the system by minimizing the steps that the user is required to perform. The payment system may also manage a prepaid account on behalf of the user, which the user may access and use to pay for goods and/or services or transfer money.

Embodiments of the invention may also be used to purchase one or more goods or services displayed on or in television, magazines, websites, and the like. For example, a good, such as exercise equipment, may be displayed in a magazine promotion, on television, or on a website. The user may capture an image of a barcode displayed on the magazine, television, or website, which barcode is then converted via the user's wireless device into a transaction identifier. The conversion may occur via an application stored on the wireless device (e.g., a smart phone app). The application may automatically identify the barcode as one corresponding to a transaction identifier and may automatically convert the barcode to obtain the transaction identifier. The wireless device may then transmit the transaction identifier to the payment service to pay for the exercise equipment. The payment system may then communicate with the merchant offering the exercise equipment and/or with a payment service provider and/or the user's bank and merchant's bank to complete the transaction. The payment system may then send a confirmation of the purchase to the user's wireless device and may transmit the user's shipping information to the merchant so that the exercise equipment may be shipped to the user.

While embodiments of the invention have been briefly described, further details of embodiments of the invention will be realized with regard to the figures. With regard to FIG. 1, illustrated is an embodiment of a system 100 that may be used to perform the methods described herein. The system 100 includes a payment system 120 that communicates with one or more other systems, components, or devices to perform a payment transaction. The payment system may include one or more computational devices (e.g., servers, computers, processors, memory, and the like), such as those described in FIG. 9, that facilitate in performing the payment transaction. The payment system 120 is communicatively coupled with a merchant point of sale device 104 (POS device), which may be communicatively coupled with a barcode device (not shown) that reads barcodes of products offered by the merchant. The POS device calculates a total sale price for the goods or services purchased during a purchase transaction. The POS device may also be communicatively coupled with a scanner device 106, such as a credit card/debit card scanner. The scanner device 106 may include a display 107, keypad 108, and card reader 109. Information, such as a matrix barcode or Quick Response code (QR code) described herein, may be displayed to the customer (not shown) on display 107, and information (e.g., PIN number) may be input by the customer on keypad 108. The scanner device 106 may also include or be an NFC device or other wireless device (e.g., Bluetooth). Scanner device 106 may be a preexisting credit/debit card reader, such as Verifone's Vx 570 terminal, and need not be specifically designed or updated to operate in accordance with the methods described herein. In other words, the methods and systems described herein may utilize pre or already existing merchant devices and components (e.g., preexisting card readers) and offer the advantage that they may not require specialized or unique equipment or components. As such, system 100 provides an efficient approach to a new commerce method since the merchant may efficiently use resources already widely available and need not acquire new devices adapted or specifically designed to the new commerce method. This minimizes merchants' investment costs and facilitates implementation of the new commerce method. System 100 may essentially be designed to be used with any POS device which has a display screen (i.e., essentially all widespread terminal types currently available). System 100 can also be used by merchants who currently do not have an existing card terminal, since any screen (including mobile phones) which has some connection to the Internet, or another network, may be used. Thus, system 100 provides the additional advantage of being interoperable with a wider range of existing resources than current commerce processes (e.g., credit cards, debit cards, checks, mobile wallets, and the like). System 100 may be used via POS devices which can have any common host connection (PSTN, IP, ISDN, and the like).

Although the POS device 104 is illustrated in FIG. 1 as a physical device, it should be realized that in some embodiments the POS device may represent a website, vending machine, kiosk, magazine advertisement, television screen advertisement, and the like, depending on the type of transaction being performed. For example, if the customer is purchasing a product from an advertisement in a magazine or displayed on the television or on a website, the POS device 104 may represent the magazine, computer, or television displaying the product. In such cases, the POS device need not include a scanner device 106, thus offering the advantage of minimizing the number of devices required.

The POS device 104 may transmit purchase information or transaction details to the payment system 120, which may include a payment amount for a purchase being made at the POS device 104, merchant identifier or other information, product information, tax information, date, time, and the like. The purchase information may be transmitted to the payment system 120 over a network, such as the Internet, telephone line, and the like. Along with sending purchase information, the POS device 104 may request a transaction identifier from the payment system 120. A transaction identifier may be transmitted from payment system 120 to POS device 104 via the network connection. The transaction identifier may comprise an alphanumeric code that is associated with the purchase information and that represents the transaction pending at the POS device between the merchant and the customer. POS device 104 may convert the transaction identifier into a barcode that may be displayed on display 107 and/or may wirelessly transmit the transaction identifier from scanner device 106 and/or another device. The transaction identifier may be captured by a wireless device 102 of the user via NFC, a camera (e.g., photograph), and/or any other means. The user's wireless device need not include hardware specifically designed to interact with scanner device 106 (i.e., a customer may use a pre-existing wireless device). For example, wireless device's having camera capabilities are already widely available. These wireless devices are already likely interoperable with scanner device 106. Thus, a user need not purchase a new wireless device in order to perform the commerce methods described herein.

Payment system 120 is also communicatively coupled with one or more payment service provider systems 140, which may be the merchant's acquiring bank. The payment system 120 may query the payment service provider system 140 to determine if the merchant can accept wireless payments as described herein. The payment system 120 may also transmit authorization requests to the payment service provider system 140, such as when a credit card is used, and receive authorization for specific transactions from the payment service provider system 140. The payment service provider system 140 may operate with issuing banks 150B and merchant banks 150A to transfer funds to pay for purchased goods and/or services, and to authorize credit card or other transactions. In some embodiments, the payment system 120 may operate in place of payment service provider system 140 to settle transactions (e.g., credit transactions, debit transactions, and the like), thus, payment system 120 may directly operate with issuing banks 150B and merchant banks 150A offering improvements in efficiency by minimizing resources. Likewise, in other embodiments, such as when the payment system 120 manages a prepaid account for the customer, the payment system 120 may operate directly with the merchant bank 150A to settle a transaction.

The payment system 120 is also communicatively coupled with e-commerce systems 130, such as online money transfer services (e.g., PayPal). Payment system 120 is capable of sending payment authorization requests to e-commerce system 130 and receiving authorization to use the online money transfer services during a transaction. For example, payment system 120 may route purchase information (e.g., payment amount, customer PayPal account information, merchant PayPal or other account information, and the like) to PayPal to determine if PayPal's service may be used to complete the transaction and/or whether the customer's PayPal account may be debited for the transaction amount. Payment system 120 may communicate with PayPal to provide the customer's password, shipping, and/or other information. Payment system 120 may also transmit payment requests to e-commerce system 130 (e.g., PayPal) after a purchase transaction is completed to effect a transfer of funds to the merchant's account.

Payment system 120 may also be communicatively coupled with one or more databases 138 that store information about the customer (i.e., user profile information), such as payment account information, shipping information, and the like. Database 138 may also represent a user profile stored on a cloud network. Payment system 120 may access the user's profile on the cloud network 138 during a payment transaction. Coupon information and/or other information (e.g., rebate information, promotional information, prepaid account information, buy one or more get one information, and the like) may also be stored in database or cloud network 138. During a transaction, payment system 120 may access a user's profile stored on database or cloud network 138 to determine a default payment account for the customer and/or whether the customer has any coupons or rebates that may be applied to goods or services being purchased. Account information, such as the user's checking account balance and/or number, prepaid account balance, credit card account balance and/or number, and the like, may be transmitted to the customer for review and/or authorization to proceed with the transaction. The customer may confirm the use of an account, such as the default account, select an alternative account from the user profile, and/or provide additional account information to use to complete the transaction.

Payment system 120 may also be communicatively coupled with a computation device 134, such as the user's laptop or personal computer. The user may access the user's profile using device 134 to add funds to a prepaid account, change user profile setting (e.g., shipping and/or billing address, email address, phone number, and the like), change a default payment account, establish one or more preferences, such as paying for certain items with a specific account, change security verification information (e.g., password, authentication questions), and the like. The user may also add coupon information to the user profile, such as by downloading coupons to the user profile, uploading coupon barcodes or images, manually entering coupon information or barcodes, and the like.

Computation device 134 may also display one or more websites to the user, which may advertise goods or services, barcodes, and/or transaction identifier that may be captured by wireless device 102.

Payment system 120 is also communicatively coupled with a wireless carrier 110 that provides communication with wireless device 102. Data may be relayed between wireless device 102 and payment system 120 via wireless carrier 110. For example, the transaction identifier may be sent from wireless device 102 to payment system 120 via wireless carrier 110. Likewise, confirmation messages, authorization requests, password requests, and the like may be transmitted from payment system 120 to wireless device 102 via wireless carrier 110. As described previously, wireless device 102 may capture the transaction identifier from POS device 106. For example, a camera (not shown) of wireless device 102 may capture an image of a barcode displayed on display 107 of scanner device 106. Wireless device 102 may then convert or decipher the barcode to obtain the transaction identifier, which may then be relayed to payment system 120 via wireless carrier 110. Alternatively, wireless device 102 may capture the transaction identifier from POS device 104 and/or scanner 106 via NFC, Bluetooth, or via any other wireless communication and transmit the transaction identifier to payment system 120. Transmission over wireless carrier 110 may be performed via GPRS, G3, mobile internet, and the like.

In some embodiments, payment system 120 may generate a barcode from the transaction identifier and transmit the barcode to POS device 104. Wireless device 102 may capture the barcode from POS device 104 and transmit the barcode to payment system 120 without converting or deciphering the barcode. This minimizes the number of process steps required at the wireless device, and thus advantageously minimizes computational demand on the wireless device. This approach also advantageously means the user devices is not required to be specially adapted for deciphering. Payment system 120 may then convert or decipher the barcode received from wireless device 102 to determine the pending transaction associated with the barcode and transaction identifier.

Figure 2:
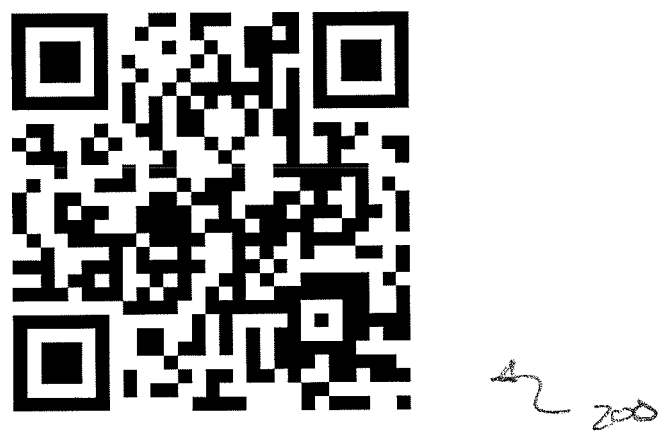
FIG. 2 illustrates a matrix barcode and specifically a QR code that may be displayed on a merchant point of sale device according to an embodiment of the present invention.

FIG. 2 illustrates an embodiment of a barcode 200 that may be displayed on display 107. Barcode 200 may be generated from a transaction identifier and may represent an alphanumeric code associated with a pending transaction. Wireless device 102 may capture barcode 200 using a camera or scanner and convert or decipher barcode 200 to obtain the transaction identifier. Barcode 200 may be a matrix barcode (e.g., two dimensional barcode), such as the QR code displayed in FIG. 2 or may be any other type of barcode. One advantage of matrix barcodes, such as QR code 200, is the ability to store large amount of data that may be easily decipherable by a wireless device, such as a mobile or cell phone.

Figure 3:
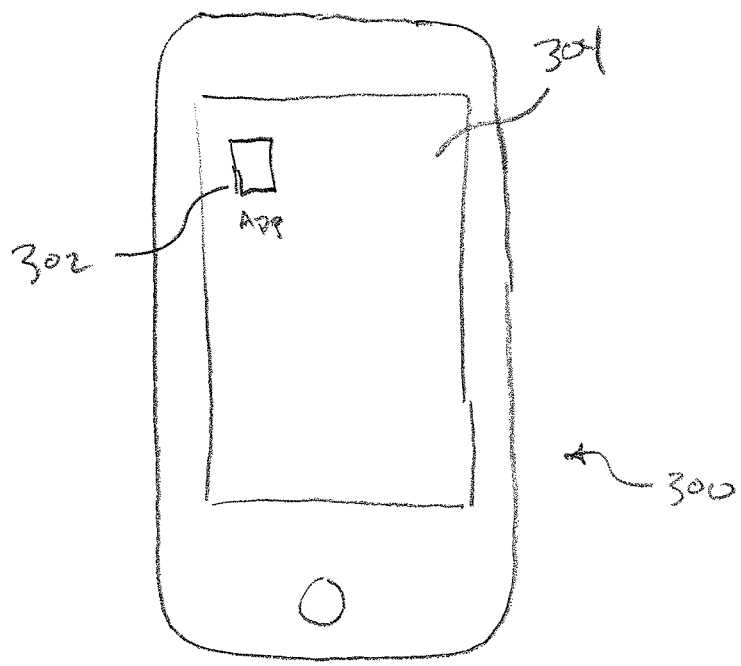
FIG. 3 illustrates a wireless device having a payment system application software according to an embodiment of the present invention.

FIG. 3 illustrates an embodiment of a wireless device 300, which may be used to perform the payment transactions described herein. Wireless device 300 may include a mobile or cell phone, a personal digital assistant (PDA), a tablet computer (e.g., iPad®), and the like. Wireless device 300 may include a camera (not shown) capable of capturing images of barcodes, such as QR code 200, and/or may include a scanner (not shown), which is capable or reading barcodes, such as QR code 200. Wireless device 300 may include application software 302, or simply an app, that may be executed to perform the payment transactions described herein. For example, the user may select app 302 from a touch screen display 304 of wireless device 300, which may initiate a camera or scanner (not shown) of wireless device 300. The user may then capture barcode 200 using the camera or scanner and app 302 may convert or decipher the barcode to obtain the transaction identifier. App 302 may automatically transmit the transition identifier to payment system 120 for processing. The transaction identifier may be automatically routed (i.e., without user involvement) to payment system 120 to simplify the process and since the transaction identifier may not represent any meaningful data to wireless device 102. In other embodiments, app 302 may query the user about whether to send the code and may send the code when an authorization is provided by the user.

In some embodiments the user may select a pre-photographed/scanned barcode (i.e., previously captured barcode) and then select app 302, or vice versa, to convert or decipher the pre-photographed/scanned barcode 200. If the deciphered barcode 200 represent an alphanumeric code having a proper format, the alphanumeric code may be automatically transmitted to payment system 120.

Figure 4:
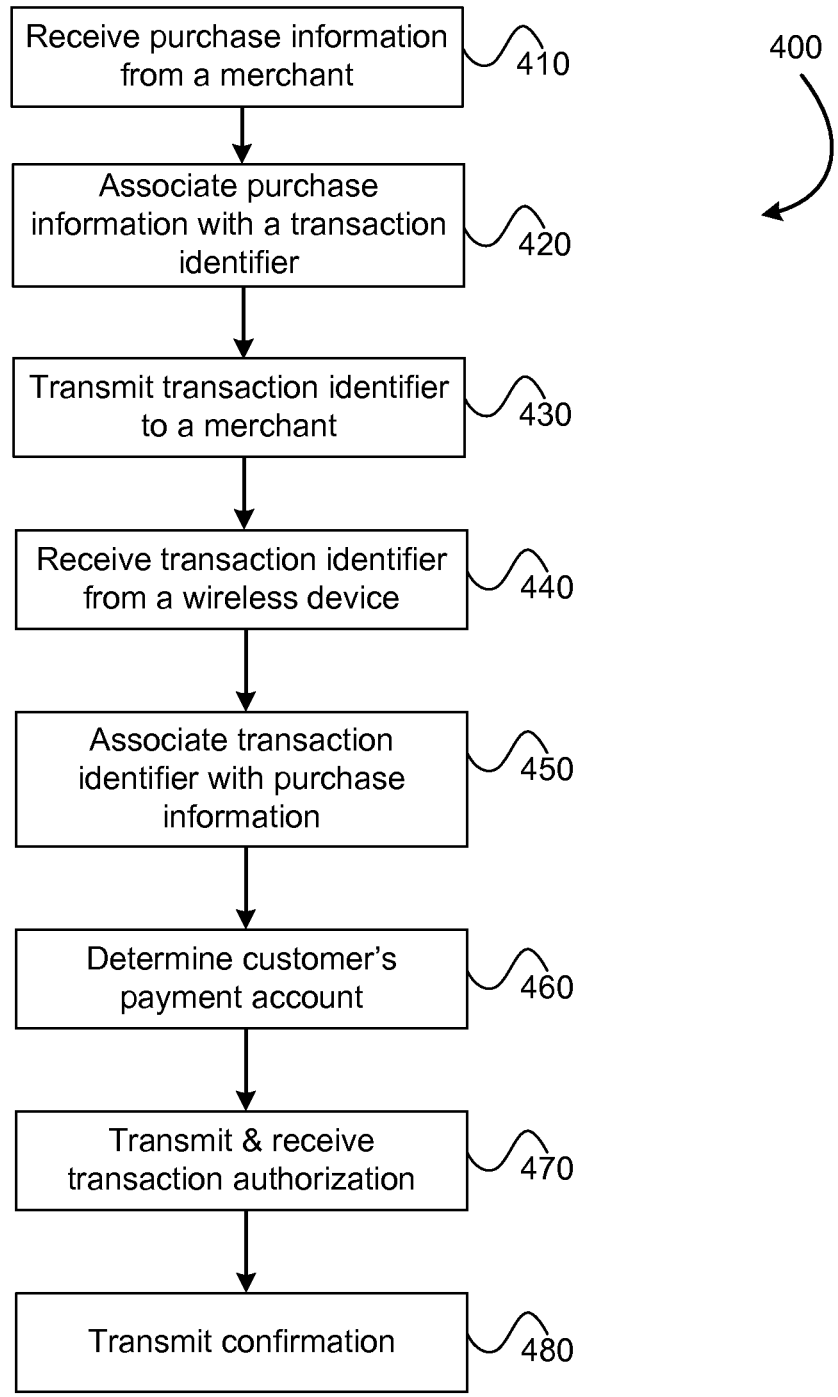
FIG. 4 illustrates a method for performing a payment transaction using a wireless device according to an embodiment of the present invention.

FIG. 4 illustrates one embodiment of a method 400 for performing a wireless payment. At block 410, purchase information is received at the payment system from a merchant. The purchase information may include information about one or more goods or services to be purchased by a customer and may include information about the merchant, such as a merchant id or code, a physical address, account information, and the like. The purchase information may also include a request for a transaction identifier that represents the purchase. At block 420 the payment system associates the purchase information with a transaction identifier, such as a unique alphanumeric code that represents that purchase information. At block 430, the payment system transmits the transaction identifier to the merchant. In some embodiments, a device at the merchant location, such as a POS device, may generate a machine readable code (e.g., a matrix barcode, QR code, and the like) that encodes the information of the transaction identifier (e.g., the alphanumeric code). The machine readable code may then be displayed on a device at the merchant location so that an image of the machine readable code may be captured by a customer's wireless device. In other embodiments, the transaction identifier (e.g., alphanumeric code) may be wirelessly transmitted from the merchant's device to the customer's wireless device, such as via NFC, Bluetooth, and the like. Capturing the machine readable code from the POS device provides the advantage that no customer information (e.g., account information, personal information, PIN number, and the like) is passed from the consumer to the merchant, thereby eliminating the risk of fraud that may be present in conventional wireless device transactions where such information is passed from the wireless device to the merchant. The methods of capturing the transaction identifier described herein enable a new commerce method and provide interoperability between already widely available merchant and consumer devices.

Alternatively, the processes and/or sequence of processes described in blocks 410-430 may be changed or slightly modified so that one or more transaction identifiers are cached or stored on the POS device as described above. The POS device may then convert a transaction identifier into machine readable code and display or provide the machine readable code to a customer without having to establish a connection with the payment system. The POS device may associate the transaction identifier with the purchase information and send this information (e.g., the purchase information and corresponding transaction identifier) to the payment system.

At block 440, the payment system receives the transaction identifier from the customer's wireless device. The transaction identifier may be received from the wireless device via General Packet Radio Service (GPRS), $3^{rd}$ Generation Mobile Telecommunications (3G), mobile internet, Short Message Service (SMS), Multimedia Messaging Service (MMS), Unstructured Supplementary Service Data (USSD), and the like. The customer's wireless device may obtain the transaction identifier by converting, interpreting, or deciphering the machine readable code (e.g., QR code) if an image of the machine readable code is captured by the wireless device, or the wireless device may simply transmit the transaction identifier if the transaction identifier is received via wireless transmission from the merchant device. The transaction identifier and method involving the transaction identifier described herein provides improved efficiency since the same transaction that the payment system associated with the purchase information is subsequently provided to the payment system. Further, the transaction identifier and methods described herein provide a simple commerce method since required user input is minimized and/or virtually eliminated because the payment system, merchant system, and/or wireless device perform nearly all operations.

At block 450, the payment system associates the transaction identifier received from the wireless device with the purchasing information received from the merchant so that the payment system may determine which pending transaction the customer wishes to complete. At block 460, the payment system determines a payment account associated with the customer. The payment account may be a default account specified on the customer's user profile stored on a cloud network or may be an account selected by the customer and transmitted to the payment system. Such selection may occur via app 302, which may display the different payment accounts available for selection and transmit account information to the payment system for the selected account. The customer may select from among a plurality of accounts displayed on the wireless device and stored on the cloud network, or the customer may manually enter account information into the wireless device, which may be transmitted to the payment system. In some embodiments, the payment system prompts the customer for a selection of an account, such as when a default account is not specified or when the customer's user profile does not include account information. The customer may also override the use of a default account and select a new account to use.

In some embodiments, the payment system transmits an authorization request to a payment service provider system to provide funds for the payment transaction (block 470). In other words, the payment system sends a request to an acquirer to determine if funds will be provided from the customer's account to pay for the pending purchase transaction. The payment system then receives an authorization from the payment service provider system indicating that the transaction has been authorized and that funds will be provided for the pending purchase transaction (block 470). In other embodiments, the payment system may function in a capacity similar to the payment service provider to authorize the purchase transaction in which case the authorization request is transmitted from the payment system to an issuing bank and the authorization is received from the issuing bank indicating that funds are available for use by the customer. At block 480, a confirmation of the authorization received from the payment service provider is transmitted to the merchant to confirm that funds will be provided to pay the merchant. The merchant may then transfer one or more goods or services to the customer. The pending purchase transaction may then be settled through the payment service provider, issuing bank, and merchant bank or through the payment system if the payment system is functioning in a capacity similar to the payment service provider. To settle the pending purchase transaction, the payment system may transmit a request to the payment service provider system to provide funds to the merchant to pay for the purchased goods and/or services.

In other embodiments, the authorization and settlement may occur through an e-commerce system, such as an online money transfer system (e.g., PayPal). In such embodiments, the method 400 may additionally include the payment system querying the user for an e-commerce system username and/or password (e.g., PayPal username and/or password) or this information may be stored on the customer's user profile. The payment system then transmits the username and/or password to the ecommerce system and receives an authorization that indicates funds are available for use. The payments system may also receive an account balance from the ecommerce system, which may be displayed to the customer prior to completing the transaction. Settlement may occur through the ecommerce system providing funds to the merchant's account or accounts.

The method 400 may also include the payment system transmitting a payment authorization request to the wireless device after the payment system receives the transaction identifier from the wireless device. The payment authorization request may identify the merchant, an amount of the payment transaction, and/or the goods or services being purchased. The payment system may receive a confirmation from the wireless device to continue with the payment transaction. This process may be used as a verification to ensure that the customer desires to pay for the goods or service using the wireless device and to ensure that the customer is the individual requesting payment and not someone else. The payment authorization request may also include or display an amount of funds available to use from the selected payment account. The customer may then determine whether to use the selected payment account or select an alternative or additional payment account to use. In some embodiments, the payment system may transmit a payment transaction notification to the wireless device after the payment system receives the transaction identifier from the wireless device. The payment transaction notification may identify the merchant and an amount of the payment transaction. The payment transaction notification may be used as a verification to ensure that the customer is aware that the payment transaction is pending. The payment system may then complete the payment transaction or the customer may cancel the payment transaction, such as when the payment transaction is fraudulent. Such notification, verification, and/or authorization processes provide the advantage of improved security of wireless device transactions by ensuring that the customer is aware of pending or potential purchases including amounts, merchants, products/services, and the like, and/or involved in carrying out such purchases.

The method 400 may also involve the use of coupon in performing the purchase transaction. For example, the payment system may receive coupon information from the customer's wireless device. This information may be received well in advance of the transaction or may be received during performance of the transaction. The customer, using the wireless device, may capture an image of the coupon or coupon's barcode, scan the coupon, manually input coupon or barcode information, and the like. The payment system may store the coupon information in the customer's user profile until a good or service is identified as being represented by the coupon. When a good or service is identified, the payment system may associate the coupon information with good or service being purchased and may credit the customer with an amount of the coupon. In crediting the customer with the coupon amount, the payment system may send a coupon request to the manufacturer or issuer of the coupon and receive an authorization to credit the customer in the amount of the coupon, or the coupon may be stored centrally and the purchase details are checked against the coupon criteria. In addition, when the good or service is identified as being represented by the coupon, the payment system may transmit a reminder of the coupon to the customer's wireless device and inquire about whether the customer desires to use the coupon. The payment system may then receive a confirmation to use the coupon or may receive a denial requesting that the coupon not be used.

In some embodiments, the payment account includes a credit card account, a debit card account, a prepaid account, an ecommerce account (e.g., PayPal), a checking account, a savings account, and the like. The payment system that performs the method steps above may include a communication interface that allows the payment system to transmit and receive data, information, and communication to and from other systems; a memory device having instruction stored thereon; and a processor communicatively coupled with the memory such that the instructions stored on the memory cause the processor to perform the methods described herein.

Figure 5:
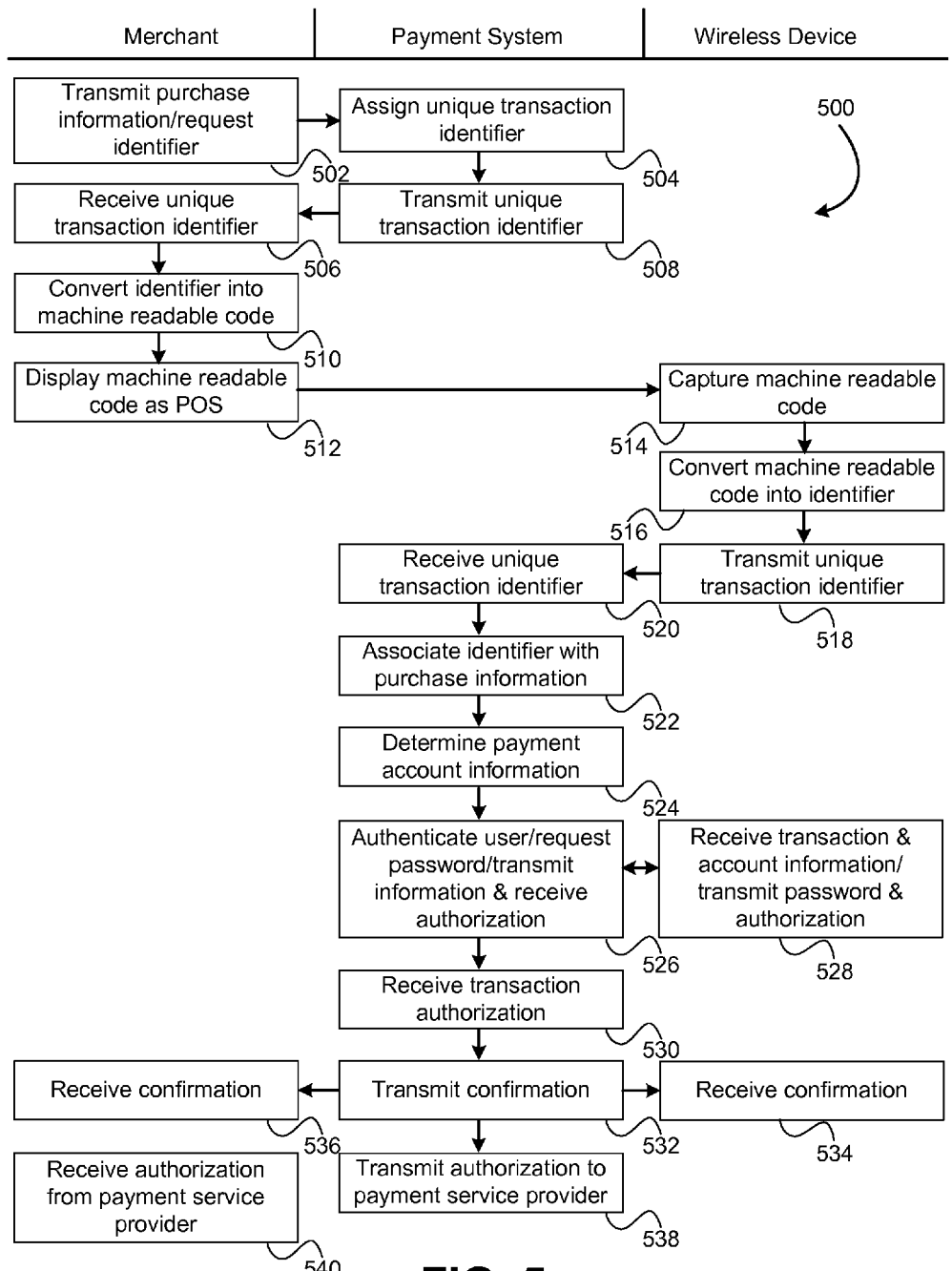
FIG. 5 illustrates another method for performing a payment transaction using a wireless device according to an embodiment of the present invention.

FIG. 5 illustrates another embodiment of a method 500 for performing a payment transaction using a wireless device. The method 500 illustrates processes that may occur at a merchant device, a payment system, and a customer's wireless device. It should be realized that the merchant may represent a physical merchant location, an online merchant, a kiosk, a vending machine, or any other merchant offering goods and/or services. At block 502, the merchant transmits transaction details (e.g., purchase information) and/or a transaction identifier request to the payments system. When the merchant is a physical location, an employee may enter purchase information into a POS device, such as by scanning products. The employee may then select a mobile payment method button that initiates communication with the payment system. The payment system may route a query to the merchant's payment provider to ensure that the merchant can accept payments (e.g., the payment system may query the party responsible for settling the transaction, such as the merchant's acquirer, an ecommerce system (PayPal), and the like). If the merchant is capable of accepting payments, the payment system accepts the transaction details from the merchant, otherwise the merchant's request is denied.

At block 504, the payment system assigns a unique transaction identifier (e.g., alphanumeric code) to the pending transaction. At block 508, the payment system replies back to the merchant device and provides the unique transaction identifier, which is received at the merchant device at block 506. In some embodiments, such as those where the wireless device photographs an image of a QR code, the merchant device converts the transaction identifier into a machine readable code. At block 512, the machine readable code is displayed on a display screen of the POS device, such as on a card reader screen. Alternatively, the machine readable code may be printed on a receipt or displayed in some other way. The customer may then present his or her wireless device (e.g., mobile phone, PDA, tablet computer, and the like) and select a payment system app, such as app 302. Selecting the app may initiate the camera or scanner of the wireless device. Alternatively, the unique transaction identifiers (or a plurality of unique transaction identifiers) may be cached on the POS device as described above.

At block 514, the wireless device may capture the machine readable code, such as by scanning/photographing and capturing an image of the machine readable code. Alternatively, the transaction identifier may be wirelessly transmitted from the POS device to the wireless device via NFC, Bluetooth, and the like. In some embodiments, the machine readable code is converted, interpreted, or deciphered into the transaction identifier at block 516. The conversion or interpretation may be performed by the app. At block 518, the transaction identifier is transmitted to the payment system, such as via GPRS, G3, mobile internet, and the like. At block 520, the payment system receives the transaction identifier from the wireless device (in some embodiments, the machine readable code may be generated by the payment system, transmitted to the merchant, and received from the wireless device in which case the machine readable code is converted by the payment system into the transaction identifier). The app may transmit the identifier automatically after capturing the machine readable code (or transaction identifier) and converting the code into the transaction identifier. In such embodiments, the customer's only participation up to this point may be selecting the app and operating the wireless device's camera/scanner or positioning the wireless device in a location sufficient to receive the NFC, Bluetooth, etc. transmission. In other words, the customer need not be actively involved in performing the purchase transaction other than a few minor inputs. Thus, this simplified and efficient method provides for improved user interaction.

At block 522, the payment system associates the transaction identifier with the pending purchase transaction to determine that the customer wishes to complete the transaction pending at the merchant. At block 524, the payment system may determine payment account information to use to complete the transaction, such as a default payment account identified on the customer's user profile stored on a cloud network. As described herein, the customer can specify other accounts to use, manually enter account information, and the like.

At block 526 and 528, the payment system may communicate with the wireless device to receive a variety of additional information, receive an authorization to proceed with the transaction, authenticate the customer, and the like. For example, the payment system may transmit details of the pending transaction to the wireless device so that the customer can verify that the payment system has associated the transaction identifier with the correct pending transaction.

Such transaction details may include, an identification of the merchant, the transaction amount, the goods and/or services being purchased, and the like. The customer may transmit a confirmation message to the payment system to confirm that the purchase transaction is correct and authorize to continue with the transaction or may indicate that the purchase transaction is wrong, in which case the process could be repeated. The transaction details may also include an indication of the default account to use or may include a listing of a plurality of accounts (stored on the user profile) that the user may select from. The customer may confirm to use the default account, select another account to use (or select an account to use if a default account is not specified), enter in account information to use, and the like. The payment system may also transmit account balance information for one or more of the plurality of accounts so that the customer may determine which account to use. In some embodiments the customer may select multiple accounts to use and designate an amount to use from each account.

The payment system may also communicate with the wireless device to authenticate the customer. For example, the payment system may request that the customer enter a PIN or other password on the wireless device or may request that the customer provide a biometric identification (e.g., fingerprint, retinal scan, facial scan, and the like). The payment system may also determine a location of the merchant and a location of the wireless device (e.g., via GPS) and verify that they are substantially in the same location. An additional or alternative authentication may involve transmitting an out of band authentication message to the wireless device via an alternative communication channel (e.g., Unstructured Supplementary Service Data (USSD) and the like) and receiving a confirmation response via the same or a different channel to enact a two factor authentication. The payment system may select the customer authentication method based on the amount of the transaction so that small transaction amounts require little or no authentication whereas large amounts require extensive or strict authentication. The amount of authentication that is required may be driven from a number of factors including: merchant profile, transaction amount, authentication requirements as defined by the customer's payment account, and the like. The various authentications may include a 4-6 digit pin, an individual number within the pin, a password, a USSD/SMS message, and the like. This offers advantages of improved user interaction and minimizing user input depending on the context of the transaction.

An example of the communication between the payment system and the wireless device in blocks 526 & 528 may involve the customer selecting a payment service provider such as PayPal for example as the payment option. In response to that selection, the payment system may route the customer's PayPal user details and the amount to be debited to PayPal. PayPal may confirm that the customer is a PayPal user and that the account may be used to pay for the pending transaction. PayPal may request that the payment system provide the customer's password. The payment system may query the customer for this information and route the password back to PayPal. The payment system may also determine one or more security authentication to use depending on the purchase amount. Thus, the payment system may transmit a USSD message to the wireless device and continue with the transaction when a response is received. If no response is received or if the response is inadequate, the payment system may end the transaction.

After information has been exchanged in blocks 526 & 528 (if necessary), the payment system may receive an authorization for the transaction at block 530, such as from a payment service provider system, e-commerce system, and the like as described herein. At block 532, the payment system transmits a confirmation message to the merchant and/or wireless device, which may be received at blocks 536 & 534, respectively. The confirmation message confirms that the transaction has been authorized and that funds will be provided to pay for the pending transaction. In some embodiments, the payment system then sends an authorization message to the payment service provider system that instructs the payment service provider to settle the pending transaction. In such embodiments, the merchant may receive a transaction authorization message from the payment service provider (block 540) that confirms that funds will be provided. In other embodiments the payment system may function in a settlement capacity and the payment service provider system is not needed.

Additional embodiments of the invention may include using both a machine readable code and wireless transmissions to complete a payment transaction. For example, the wireless device may be used to photograph images of coupon barcodes as described herein and may be used to receive the transaction identifier via NFC, Bluetooth, and the like. Thus, a combination of the embodiments described herein may be employed and the invention need not be limited to the embodiments described herein.

Figure 6:
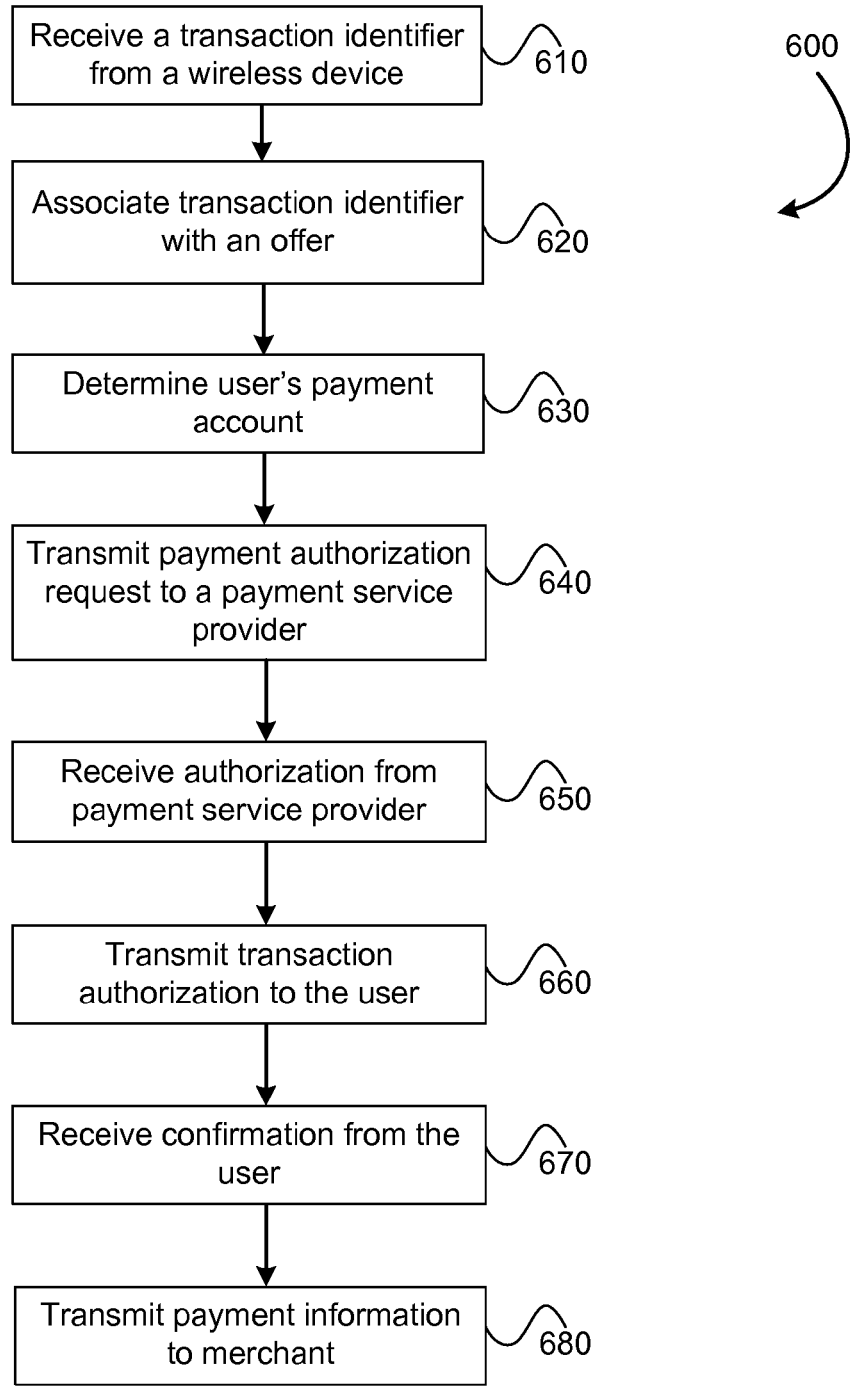
FIG. 6 illustrates another method for performing a payment transaction using a wireless device according to an embodiment of the present invention.

FIG. 6 illustrates an additional embodiment of a method 600 for performing an electronic transaction. Method 600 is particularly useful for situations that do not involve a physical merchant location, such as when items are being purchased directly from magazine or television advertisements and thus there is minimal or no customer-merchant interaction. At block 610, a transaction identifier is received at the payment system from a wireless device associated with a user. The transaction identifier may be obtained by the wireless device upon the wireless device receiving readable code and interpreting the readable code and/or receiving a wireless communication as described herein, for example, the user photographing a barcode displayed in a magazine, on a television advertisement, or on a webpage. The readable code may be obtained from any of the following sources: magazine, a periodical, a book, a vending machine, a television screen, a movie screen, a computer screen, a billboard, a POS device, an advertisement, and the like. At block 620, the payment system associates the transaction identifier with one or more goods or services offered and/or advertised by a merchant.

At block 630, the payment system determines payment account information associated with the user. At block 640, the payment system transmits a payment authorization request to a payment service provider's system to provide funds for payment of the one or more goods or services. In other embodiments, the payment authorization request is transmitted to an e-commerce system (e.g., PayPal) or the payment system functions in a capacity similar to a payment service provider and the authorization request is sent to an issuing bank or the customer's bank. In still other embodiments, a user's prepaid account is used, which may be managed by the payment system, and an authorization request message is not necessary. At block 650 (if necessary), the payment system receives, from the respective system (e.g., payment service provider system, e-commerce system, and the like), an authorization to provide funds for the payment transaction. At block 660, the payment system may optionally transmits a transaction authorization request to the wireless device to verify and/or authorize the transaction. At block 670, the payment system receives a confirmation from the wireless device to authorize the transaction, if necessary. At block 680, the payment system transmits payment information to the merchant to effect a transfer of the one or more goods or services to the customer. The payment information transmitted to the merchant may include a shipping address of the customer, which may be stored on a user profile on a cloud network.

The method 600 may be used to purchase goods and/or service directly from television, webpage, magazine, etc. advertisements. To purchase such goods or services, the consumer merely needs to capture an image of the advertisement, such as by photographing or scanning a barcode, or using software to recognize the advertisement of the product that is being sold, and confirming the purchase. The payment system may perform all or a portion of the other payment processes, such as authorization, settlement, shipping confirmation (e.g., providing shipping details), and the like, thereby optimizing efficiency in the system by centrally performing transaction processes eliminating the need for additional user input or action. The process may be further simplified by removing the user confirmation requirement, such as for purchases with low transaction values, so that the user merely needs to photograph an advertisement (e.g., barcode or advertisement image) and wait for a product or service to be delivered. Such direct transactions may greatly enhance commerce and provide the advantage of improved efficiency in commerce by minimizing the number of steps required by the user.

Figure 7:
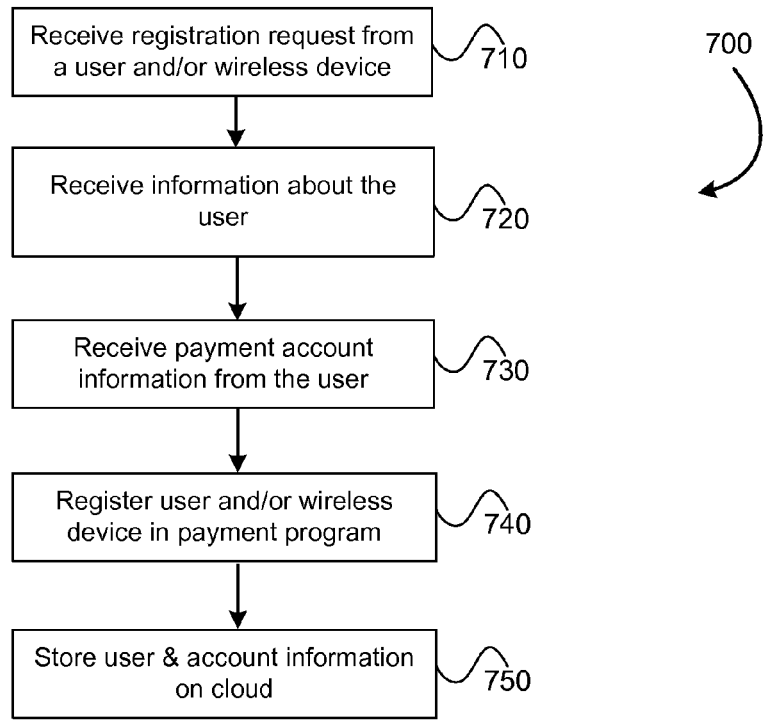
FIG. 7 illustrates a method for registering a wireless device in a payment service according to an embodiment of the present invention.

FIG. 7 illustrates an embodiment of a method for registering a user with a payment service of a payment system. At block 710, the payment system receives a registration request from the user. At block 720, the payment system receives information about the user of the wireless device, which may include: a shipping address, an email address, a telephone number, a wireless device identifier (e.g., MSISDN number), a billing address, a user identifier, a wireless device application (e.g., smart phone app) identifier, and the like. At block 730, the payment system receives payment account information from the user, which may include: information about a credit card, a debit card, a checking account, a savings account, an e-commerce account (e.g., PayPal username and/or password), a prepaid account, and the like. The payment account information may also include a designation of a preselected or default account from among the plurality of accounts. At block 740, the payment system registers the user in the payment service program. At block 750, the user's personal and account information is stored on a cloud network and/or on a database. The registration method 700 may be performed prior to the user performing a payment transaction with the wireless device or may occur during the payment transaction. In some embodiments, registering the user with the payment service of a payment system includes registering the wireless device with the payment service or registering an application of the wireless device with the payment service. Likewise, in some embodiments, the user registration and/or information provided by the user is transmitted or provided to the payment system via the wireless device, so that the registration process is performed via the wireless device. In other embodiments, the registration process is performed via a device or system other than the wireless device, such as a laptop or personal computer and/or via one or more networks, such as the Internet.

Figure 8:
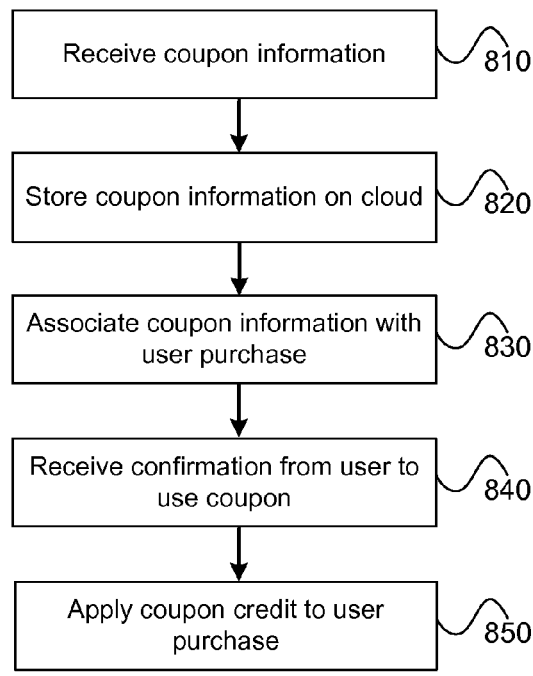
FIG. 8 illustrates a method for receiving coupon information that may be used in performing payment transactions according to an embodiment of the present invention.

FIG. 8 illustrates an embodiment of a method 800 for receiving coupon information at the payment system. At block 810, the payment system receives coupon information from a user's wireless device (or from a personal computer or other device). The coupon information may be input into the wireless device as described herein (e.g., using a camera, scanning, manual input, email, download, wireless communication (e.g., NFC, Bluetooth), and the like). At block 820, the payment system stores the coupon information on the user's profile on a cloud network or database, which provides the advantage of increasing commerce efficiency by eliminating the need for the user to retain a physical copy of the coupon. At block 830, the payments system associates the coupon information with one or more goods or services being purchased by the user in a pending transaction with a merchant. The payment system may automatically associate the coupon information with the good(s) and/or service(s) being purchased without requiring input from the user, thereby providing the advantage of increased commerce efficiency by eliminating the need for the user to remember that the user possesses a coupon corresponding to the good(s) and/or service(s) being purchased. Block 830 may be optional depending on whether the user or the payment system selects to use the coupon. At block 840, the payment system receives a confirmation from the user to use a selected coupon. The user can select the coupon from the user's profile and request the payments system to use the coupon, or the payment system may select the coupon and query the user about whether to use the coupon. At block 850, the payment system applies the coupon to the pending purchase transaction so that the user is credited with an amount of the coupon value.

Figure 9:
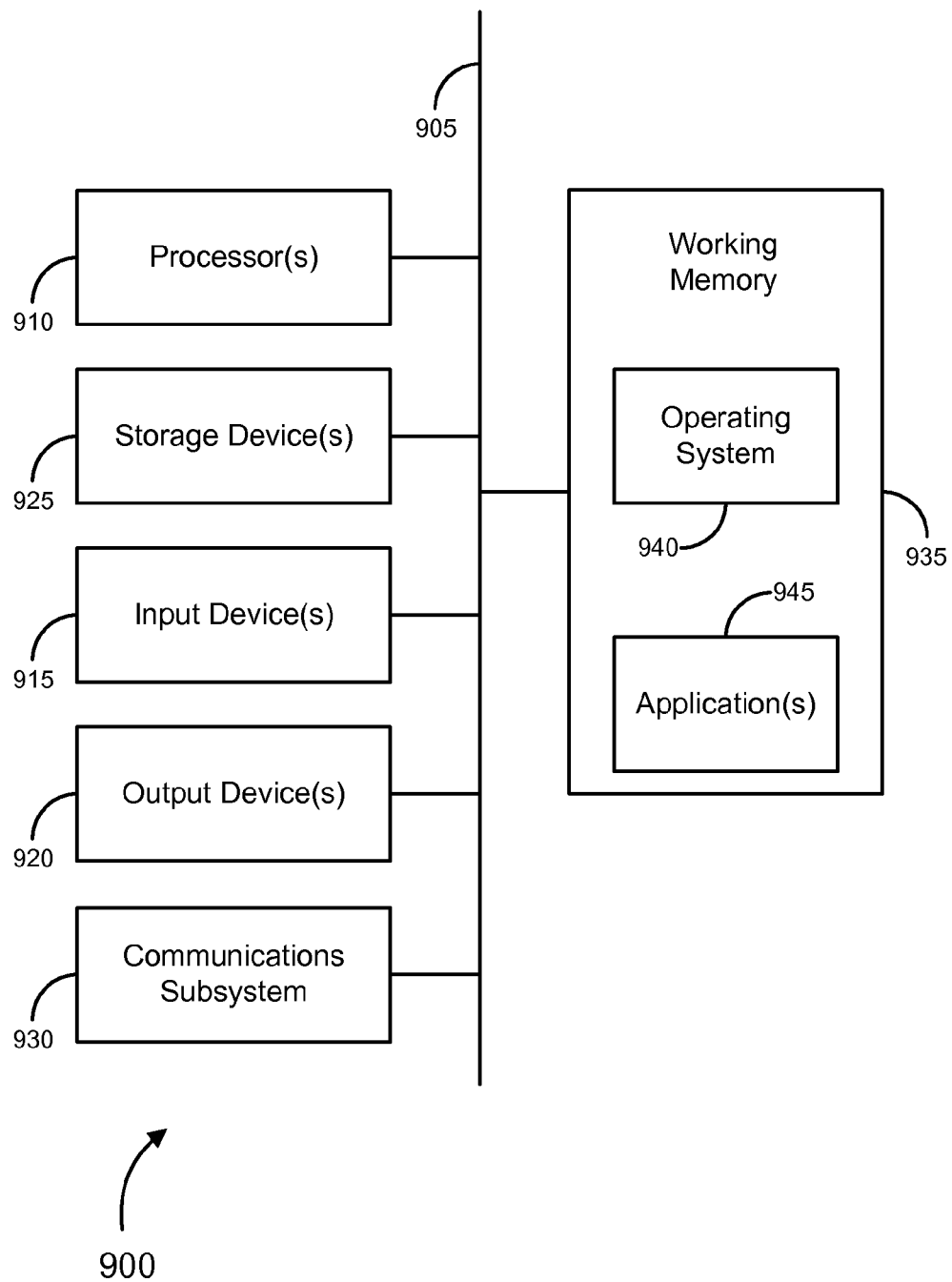
FIG. 9 illustrates a computer system that may be used to implement the methods and systems described herein according to an embodiment of the present invention.

To perform the actions of the payment transactions and payment systems and/or any of the other previously mentioned computing devices described herein, a computer system 900 as illustrated in FIG. 9 may be used. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communication subsystem 930 (and/or the media by which the communications subsystem 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a storage device 925 either before or after execution by the processor(s) 910.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those skilled in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for performing a payment transaction comprising:
    transmitting, via one or more processors of a payment system, a transaction identifier to a merchant terminal in a payment transaction;
    in a subsequent payment transaction occurring at the merchant terminal, receiving at the payment system, the transaction identifier and purchase information from the merchant terminal, the purchase information comprising information associated with one or more goods or services to be purchased by a customer and the transaction identifier having been associated with the purchase information by the merchant terminal;
    generating a machine readable code based on the transaction identifier by the merchant terminal;
    receiving, by a wireless device associated with the customer, the machine readable code from a merchant terminal;
    subsequent to receiving the machine readable code from the merchant, converting the machine readable code into the transaction identifier;
    obtaining at the payment system, the transaction identifier from the wireless device;
    associating via the one or more processors, the transaction identifier received from the wireless device with the purchasing information received from the merchant;
    determining, via the one or more processors, a payment account associated with the customer;
    subsequent to receiving the purchase information from the merchant, receiving, at the payment system and from the wireless device, a password for the payment account, wherein the password is used to authenticate that the customer is associated with the payment account;
    transmitting, via the one or more processors and to a payment service provider, an authorization request to provide funds for the payment transaction;
    receiving, at the payment system and from the payment service provider, an authorization to provide funds for the payment transaction; and
    transmitting, via the one or more processors, a confirmation of the authorization to the merchant so as to effect a transfer of the one or more goods or services to the customer.

2. The method of claim 1, wherein determining a payment account comprises receiving an identification from the customer of an account to use in completing the transaction from among a plurality of accounts stored on a cloud network.

3. The method of claim 2, wherein the identification of the account to use in completing the transaction is provided by the customer in response to a request for account information transmitted to the wireless device.

4. The method of claim 1, wherein the payment account comprises an account selected by the customer for use in funding payment transactions, wherein the selection of the account occurs prior to the step of receiving purchase information from the merchant.

5. The method of claim 1, further comprising:
    receiving coupon information or other benefit from the wireless device of the customer;
    associating the coupon information with the one or more goods or services to be purchased by the customer; and
    completing the payment transaction so that the customer is credited with an amount of the coupon or other benefit.

6. The method of claim 5, further comprising:
    transmitting the coupon information to the wireless device along with a request to use the coupon in the payment transaction; and
    receiving a confirmation from the wireless device to use the coupon in the payment transaction.

7. The method of claim 5, wherein the customer obtains the coupon information via one or more means selected from the group consisting of:
    capturing an image of the coupon with the wireless device;
    accessing an email comprising information associated with the coupon;
    downloading information associated with the coupon;
    receiving a wireless communication comprising information associated with the coupon;
    receiving a Near Field Communication comprising information associated with the coupon; and
    capturing an image of a barcode associated with coupon.

8. The method of claim 1, further comprising:
    transmitting a payment authorization request to the wireless device after receiving the transaction identifier from the wireless device, the payment authorization request identifying the merchant and an amount of the payment transaction; and
    receiving a confirmation from the wireless device to continue with the payment transaction.

9. The method of claim 1, further comprising transmitting a payment transaction notification to the wireless device after receiving the transaction identifier from the wireless device, the payment transaction notification identifying the merchant and an amount of the payment transaction.

10. The method of claim 8, wherein the payment authorization request further comprises an amount of funds of the payment account available for payment of the one or more goods or services.

11. The method of claim 1, wherein the payment account information comprises one or more selected from the group consisting of:
- a credit card;
- a debit card;
- an prepaid account;
- an online payment service provider account;
- a checking account; and
- a savings account.

12. The method of claim 1, wherein the wireless device receives the machine readable code from the merchant device by capturing an image of the machine readable code displayed by the merchant device.

13. The method of claim 12, wherein the machine readable code is either or both a 2D barcode or a QR code.

14. The method of claim 13, wherein the machine readable code is displayed on a card reader device.

15. The method of claim 1, wherein the wireless device receives the machine readable code by receiving a wireless signal transmitted by the merchant device.

16. The method of claim 1, further comprising:
transmitting a request to the payment service provider to provide funds to the merchant to pay for the one or more goods or services.

17. The method of claim 1, further comprising authenticating the customer based on the amount of the payment transaction, wherein authenticating the customer comprises one or more selected from the group consisting of:
- verifying a biometric identification received from the wireless device;
- verifying a PIN number received from the wireless device;
- verifying a GPS location of the wireless device is substantially at the same location as the merchant device; and
- receiving a response from the wireless device to a USSD verification message sent to the wireless device.

18. The method of claim 1, further comprising registering the customer with the payment service, wherein registering the customer comprises providing one or more information selected from the group consisting of:
- information about the payment account;
- shipping address information;
- default payment account information;
- a wireless device identifier;
- an identifier associated with the customer; and
- an identifier associated with a wireless device application.

19. The method of claim 18, wherein registering the customer with the payment service comprises registering the wireless device with the payment service or registering an application of the wireless device with the payment service.

20. The method of claim 1, wherein the transaction identifier is received from the wireless device via GPRS, SMS, USSD, or mobile internet.

21. A method for performing an electronic transaction comprising:
transmitting, via one or more processors of a host computer system, a transaction identifier to a merchant in a payment transaction;
in a subsequent payment transaction occurring with the merchant, receiving, at the host computer system, the transaction identifier and information about a particular purchase from a merchant, the transaction identifier that was previously transmitted having been associated with the particular purchase by the merchant for the subsequent payment transaction;
generating a machine readable code based on the transaction identifier by the merchant terminal,
receiving, by a wireless device associated with a customer, the machine readable code from a merchant terminal;
subsequent to receiving the machine readable code from the merchant, converting the machine readable code into the transaction identifier;
separately also receiving, at the host computer system, the transaction identifier from the wireless device associated with the customer;
associating, via the one or more processors, the transaction identifier received from the wireless device with the particular purchase;
determining, via the one or more processors, payment account information associated with the customer;
transmitting, via the one or more processors and to a payment service provider system, a payment authorization request to provide funds for payment of the particular purchase;
receiving, at the host computer system and from the payment service provider system, an authorization to provide funds for the particular purchase;
transmitting, via the one or more processors, a transaction authorization request to the wireless device to authorize the transaction;
receiving, at the host computer system, a confirmation from the wireless device to authorize the transaction; and
transmitting, via the one or more processors, payment information to the merchant to effect a transfer of one or more goods or services to the customer.

22. The method of claim 21, wherein the payment information comprises a shipping address of the customer.

* * * * *

UNITED STATES PATENT AND TRADEMARK OFFICE
CERTIFICATE OF CORRECTION

| | |
|---|---|
| PATENT NO. | : 9,043,237 B2 |
| APPLICATION NO. | : 13/239054 |
| DATED | : May 26, 2015 |
| INVENTOR(S) | : John F. McCarthy |

It is certified that error appears in the above-identified patent and that said Letters Patent is hereby corrected as shown below:

On the title page

Item 73 (Assignee) - Please replace "Fexco Merchant Services" and replace with -- Fexco --.

Signed and Sealed this
Twenty-third Day of February, 2016

Michelle K. Lee
*Director of the United States Patent and Trademark Office*